US012751358B2

(12) United States Patent
Mayerle et al.

(10) Patent No.: US 12,751,358 B2
(45) Date of Patent: Oct. 6, 2026

(54) WEED SEED DESTRUCTION DEVICE WITH A STRAW GUIDE SURFACE

(71) Applicant: Tritana Intellectual Property Ltd., Saskatoon (CA)

(72) Inventors: Dean Mayerle, Saskatoon (CA); Justin Regier, Aberdeen (CA)

(73) Assignee: Tritana Intellectual Property Ltd., Saskatoon (CA)

( * ) Notice: Subject to any disclaimer, the term of this patent is extended or adjusted under 35 U.S.C. 154(b) by 593 days.

(21) Appl. No.: 18/351,936

(22) Filed: Jul. 13, 2023

(65) Prior Publication Data

US 2024/0016085 A1 Jan. 18, 2024

Related U.S. Application Data

(60) Provisional application No. 63/389,048, filed on Jul. 14, 2022.

(51) Int. Cl.
*A01F 12/40* (2006.01)
*A01D 41/12* (2006.01)

(52) U.S. Cl.
CPC ................................ *A01D 41/1243* (2013.01)

(58) Field of Classification Search
CPC ..... A01D 41/1243; A01F 12/40; A01F 12/18; A01F 12/182; A01F 12/184; A01F 12/39; A01F 12/444; A01F 12/48; A01F 29/10
See application file for complete search history.

(56) References Cited

U.S. PATENT DOCUMENTS

| | | | | |
|---|---|---|---|---|
| 7,220,179 B2 * | 5/2007 | Redekop | A01F 12/40 460/112 |
| 10,499,566 B2 * | 12/2019 | Puryk | A01D 90/06 |
| 10,952,373 B2 * | 3/2021 | Rittershofer | A01F 29/04 |
| 2005/0101363 A1 * | 5/2005 | Farley | A01D 41/1243 460/112 |
| 2016/0044869 A1 * | 2/2016 | Mayerle | A01F 29/12 460/1 |
| 2019/0059218 A1 * | 2/2019 | Rittershofer | A01F 12/40 |
| 2020/0236850 A1 * | 7/2020 | Mayerle | A01D 41/14 |

(Continued)

FOREIGN PATENT DOCUMENTS

| | | |
|---|---|---|
| DE | 8228080 | 2/1983 |
| WO | WO2016021353 | 2/2016 |
| WO | WO2020181385 | 9/2020 |

*Primary Examiner* — Adam J Behrens
(74) *Attorney, Agent, or Firm* — Adrian D. Battison; Ryan W. Dupuis; Ade & Company Inc.

(57) ABSTRACT

A combine harvester includes a straw discharge rotor discharging into a straw stream and a sieve discharging into a chaff stream and a weed seed destructor section receiving the chaff and weed seeds for devitalizing at least some weed seeds. The straw is maintained out of the chaff stream by a guide construction having a front curved section underneath the rotor and a rear section which comprises a row of cantilevered flexible fingers which flex to assist in flow of the straw thereover and release of the straw from the rear end thereof. The rear ends of the fingers are thus unconnected and allow the straw to be freely released onto a dividing wall extending to the entrance to a straw chopper. The row of fingers can be carried on a support bar which is reciprocated around a transverse axis by a connection to a reciprocating element of the combine.

12 Claims, 3 Drawing Sheets

(56) References Cited

U.S. PATENT DOCUMENTS

| | | | | |
|---|---|---|---|---|
| 2022/0287236 | A1* | 9/2022 | Berry | A01D 75/187 |
| 2023/0148476 | A1* | 5/2023 | Dilts | A01D 41/1243<br>460/112 |
| 2023/0363310 | A1* | 11/2023 | Puryk | A01D 41/1276 |

* cited by examiner

WEED SEED DESTRUCTION DEVICE WITH A STRAW GUIDE SURFACE

This application claims the benefit under 35 USC 119(e) from Provisional Application 63/389,048 filed Jul. 14, 2022, the disclosure of which is incorporated herein by reference.

This invention relates to a combine harvester with a weed seed destructor (WSD) which can be attached to the combine harvester so that weed seeds in the discharged chaff can be devitalized before being spread onto the ground. In particular, the present invention relates to a guide wall which acts to separate straw above the guide wall from the chaff and weeds seeds below the guide wall to be fed to the destructor.

BACKGROUND OF THE INVENTION

In U.S. Pat. No. 10,004,176 issued Jun. 26, 2018 U.S. Pat. No. 10,485,178 issued Nov. 26, 2019, U.S. Pat. No. 10,495,369 issued Dec. 3, 2019 and PCT Publication 2019/046973 published Mar. 14, 2019 there is disclosed an arrangement in which weed seeds are destroyed in the chaff from a combine harvester by a rotary mill causing repeated high speed impacts by a rotor mounted in one of a pair of side by side housings which accelerate the discarded seeds in a direction centrifugally away from the rotor onto a stator including a series of coaxial and radially spaced stator surfaces around the axis. Thus the discarded seeds rebound back and forth between the rotor and the stator to provide a plurality of impacts.

Also in co-pending U.S. application Ser. No. 16/574,384 filed Sep. 18, 2019 which corresponds to PCT application PCT/CA2019/051320 publication WO2020/069602 published 9 Apr. 2020 there is disclosed an improved arrangement of stator for use in the above arrangements.

In U.S. Pat. No. 7,066,810 (Farley) assigned to CNH issued Jun. 17, 2006 there is disclosed a belt conveyor arranged to convey and guide the straw in the crop residue more uniformly or consistently to a selected processing mechanism at or in the rear of the combine, such as a straw chopper, spreader or the like. This reduces the possibility for heavier or larger elements of the straw, such as wads, vines, and the like, falling onto or into a chaff spreader typically located forwardly of a straw chopper and/or spreader and an outlet used for windrowing. The conveying mechanism can be positioned partially above the chaff spreader. Also, the conveying mechanism is preferably positioned in rearwardly converging or tapering relation to a crop residue hood ceiling of the body of the combine located above the conveyor mechanism, such that as the crop residue is conveyed rearwardly by the conveying mechanism, it is merged and integrated with lighter or other portions of the crop residue flow which remain airborne longer and thus are not deposited on the conveyor surface.

Reference is also made to FIG. 1 of U.S. Pat. No. 6,840,854 issued Jan. 11, 2005 of Redekop, which shows the arrangement of the straw chopper and spreader used herein.

The disclosure of each of the documents cited herein is incorporated herein by reference.

Combine mounted weed seed destructors (WSD) are becoming a common tool for destroying weeds retained in the crop while harvesting. Most of these weed seed control units are capable of devitalizing the weeds found in the chaff of a combine harvester. Research has shown that with three consecutive cycles of weed and grain removal, significant reductions in herbicide can be obtained meaning huge saving for farmers.

Weed seed destruction initially was developed in Australia due to the widespread problem of herbicide resistance weeds in the country. As this problem has developed in other areas of the world, the technology must be adapted for use with the harvest systems and conditions employed in these new areas. Often these countries have much more difficult harvest conditions than the Australians as the Australian harvest starts in their spring and progresses into the heat of their summer. The Australian harvest starts with tough and greener crops and progresses to dry and brittle harvest conditions. Most cropping regions in the northern hemisphere start with tough and green crops as the plant's complete maturity, then progress to dryer conditions until a rain or snow event stops harvest, starting again with tough crop harvesting conditions.

Most combines employ a straw beater immediately after the separating rotor(s) that act to separate the residue from the grain to throw the straw residue rearward, to the back end of the combine, to a straw chopper or straw spreading device. Some harvesters have a separating rotor(s) or a system, such as straw walkers in a conventional harvester, that carries the straw all the way to the back of the harvester so that a discharge beater is not needed to drop the residue into the chopper. Other systems include an internal straw chopper rotor where a straw discharge beater is typically utilized. In this case the straw chopper cuts and discharges the straw to the rear of the harvester to a secondary straw spreading device.

The weed seed destruction system typically is mounted at the rear of the sieves and relies on the combine harvester to separate the straw from the chaff and weed seeds. Typically, a short divider wall near the rear of the sieves acts to capture the chaff and weed seeds coming off the sieves and directs this material downwardly into the weed seed destructor. This short wall also acts as a dividing wall to keep the straw released from the straw discharge device above the sieves from falling downwardly and thus entering the inlet of the weed seed destructor. However, in harvesters with a straw discharge device in the form of a rotor forming an internal chopper or beater, there is typically a significant space between the rear edge of the straw discharge device and the leading edge of this dividing wall.

In normal or dry conditions, this system can operate satisfactorily and the action of the straw discharge device or rotor operates to throw the straw to span the space and feed over the front edge of the dividing wall.

In tough harvest conditions, with damp or green straw being processed by the harvester, often the rotor forming the internal beater or straw chopper does not throw all the straw residue all the way to the back of the harvester to the straw spreading device. This can lead to straw material hanging on the leading edge of the dividing wall and ultimately plugging the entry to the weed seed destructor. Also, often in tough conditions as the combine loads up to capacity from a stop or headland, the initial straw flow is low and the beater or internal straw chopper does not engage and throw the straw as effectively so that the straw can fall onto to the sieves.

As disclosed in the above cited patents of the present applicant, an active leading edge for the dividing wall, typically in the form of a driven roller, can solve this problem. However, a driven roller is a costly solution and one that adds significant complexity.

Also, this does not address the situation when the beater does not throw the residue far enough to even reach the active leading edge. In this case the wet, green straw residue passes through the space in front of the leading edge and lands on the sieve from which it is moved into the weed seed destructor plugging the inlet.

Most weed seed destructors as shown in the above cited patent documents have two side by side mills with a hopper system to direct the chaff and weed seeds into each mill. The wet, green straw will often bridge on the dividing wall of the hoppers ultimately plugging the system. Weed seed destructors without a hopper system also ultimately plug as the wet green straw will not feed through the mill. Ultimately the root of the problem is that the beater or straw discharge device does not throw the residue far enough in these adverse conditions.

Combines also require the air from the sieves flows to and through the system. Modern combines produce a massive amount of airflow to quickly separate the grain from the chaff on the sieves. This airflow is much greater than can be exhausted through the WSD so a significant portion of the air must be exhausted with the straw stream and in some cases with holes in the side of the cleaning system. Studies have also shown that airflow from the sieves into the straw stream is significant to the performance of the sieves. Thus a solid and impervious wall or belt separating the two residue streams would compromise the cleaning performance of the combine and thus is unsuitable.

Therefore it is important to separate the straw stream from the chaff stream that is entering the WSD to eliminate plugging conditions while still allow the air from the sieves to enter the straw stream.

Other arrangement for separating the space between the straw discharge device and the front edge of the guide wall which can be used include a flat sheet or belting between the bottom wall of the internal chopper or beater and the leading edge of the chaff dividing wall. These work well in dry conditions as the internal beater or chopper will throw the straw residue over the wall. Often the wall can accumulate 2-3 inches of fine residue laying on top of it. In dry conditions this does not matter and the material does not interfere with operation.

In wet or damp conditions, however, when the beaters typically do not throw the material the full distance this residue builds up on the flat sheet forming the front part of the divider wall and plugs the internal beater/chopper and then the entire threshing system in 2-3 seconds. This can result in many damaged parts and significant down time for the operator.

PROBLEMS WITH EXISTING TECHNOLOGY

- -a- A rotating belt conveyor as described above has been used successfully for many years to move the straw to the rear of a combine while protecting the residue from falling on the sieves. Gaps in front of and behind the conveyor allow airflow from the sieves to enter the straw stream. This is a very large, heavy, and expensive solution requiring hydraulic power and significant cost.
- -b- A reciprocating sieve extension has been proposed to provide a perforated sieve-like panel separating the straw stream from the chaff stream, however this will not clear any straw that builds up on it quickly enough and can cause a complete plug of the discharge beater and threshing rotor. In wet conditions this can build up with wet residue. This solution therefore is also not adequate.
- -c- The direction of the airflow through the sieves should be consistent and in the designed vectors to produce even and efficient cleaning of the grain and separation of chaff, that is it has been found that a complete separation between the straw and the chaff provided by a dividing barrier results in inefficient separation in separating systems that have been designed to combine straw and chaff residue in the combine hood. This does not apply to some straw walker combines or combines with a wall between the straw walker and chaff spreaders where they leave a large opening over the spreader to exhaust the sieve air.
- -d- Combine designers rely on the separating airflow to be discharged with both the straw and the chaff. If the straw flow is separated completely from the chaff it creates a reduction in exit area resulting in a pressurized cleaning area. This creates changes in airflow resulting in dirty grain samples and reduced cleaning efficiencies.

SUMMARY OF THE INVENTION

It is one object of the invention to provide a weed seed destructor system including a guide arrangement which guides the straw to the straw spreading system without affecting proper and normal operation of the combine harvester and particularly the separation system.

According to the present invention there is provided a combine harvester comprising:

a separation system for separating from harvested crop a first material at a first discharge location comprising straw and a second material comprising chaff and weed seeds at a second discharge location;

a first material discharge section at the first discharge location arranged to move the separated first material rearward for discharge along a straw discharge path, the first material discharge section including a rotary body and a guide surface cooperating with the rotary body;

the separation system including at least one sieve arranged at a height below the first material discharge section, the sieve having openings thereon allowing passage of separation air to separate chaff and weed seeds from grain and the sieve having a rear edge over which the chaff and weed seeds are discharged;

a weed seed destructor section for receiving the second material comprising chaff and weed seeds, the weed seed destructor section including components therein for devitalizing at least some weed seeds in the second material;

and a guide construction for guiding the first material comprising straw from the discharge section in the straw discharge path while maintaining separation of the first material from the second material and thus acting to reduce passage of the first material to the weed seed destructor section;

the guide construction dividing a surface over which the first material passes;

the guide construction having openings therethrough for passage of the separation air from the sieve into the straw discharge path;

the guide construction being arranged to allow the first material to be released from a rear end thereof to continue along the straw discharge path.

That is the guide construction is preferably mounted and arranged to allow the first material to be released from a rear end thereof without interference from transverse coupling elements to continue along the straw discharge path.

That is the guide construction can be arranged without a connected or common element along the rear edge.

In accordance with an optional important feature, preferably the guide construction comprises at least one flexible element which flexes during operation to assist in flow of the first material thereover and release of the first material from the rear end thereof.

In accordance with an optional important feature, preferably the guide construction comprises a plurality of fingers extending rearwardly from the front section and transversely spaced apart to allow passage of the separation air therebetween. Preferably the fingers are round in cross section and are preferably spaced wider apart than the width of the fingers so as to create little restriction to air flow to avoid change in the sieve cleaning efficiency.

In accordance with an optional important feature, preferably the guide construction comprises elements cantilevered rearwardly from a support at or on the front section such that the first material sheds rearwardly freely from the cantilevered elements. Preferably the elements are unsupported and unconnected at a rear end thereof so as not to impede free flow of the first material from the rear end. Preferably the elements do not allow any hair-pinning of material as the rear end of the elements and are unobstructed to promote the first material to slide off without restriction. Preferably the array of elements spans across a full width of the straw discharge passage.

In accordance with an optional important feature, preferably the rear edge of the guide construction terminates adjacent a fixed generally imperforate divider panel separating the straw discharge path from the weed seed destructor section.

In accordance with an optional important feature, preferably the first material discharge section includes a rotor rotatable about an axis transverse to the combine harvester for engaging the straw where the front section is located at and cooperates with the rotor. Preferably the rotor comprises a beater and the front section is curved to as to partly wrap around the beater. Preferably the rotor is arranged to form the first material into a stream and the front section extends to a rear edge from which the stream is released. Preferably the guide construction is inclined downwardly and rearwardly from the rear edge of the front section to allow flow of the first material rearwardly from the rear edge over an entrance of the weed seed destructor section.

In accordance with an optional important feature, preferably the elements form fingers which are cantilevered from a front support so that the fingers are spaced from each other to allow the air to pass between.

In accordance with an optional important feature, preferably the elements form fingers which are cantilevered from a front support so that the fingers are unsupported and unconnected at the rear end thereof so as not to impede the free flow of the first material from the rear end.

In accordance with an optional important feature, preferably the guide wall provides very low restriction to the sieve airflow from entering the stream of the first material to be discharged therefrom.

The structure can be very light weight, low cost and does not require any additional power The fingers are round in cross section and spaced wide apart to provide in effect no restriction to air flow, and change to air flow trajectory that would be part of other solutions and therefore no change in the combines cleaning efficiency In some embodiments the weed seed destructor section uses impact technology to cause the required devitalization and hence typically comprise:

a destructor rotor housing arranged to be mounted behind the rear edge of the sieve to receive the chaff and weed seeds discharged from the rear edge;

a destructor rotor arrangement mounted in the destructor rotor housing for rotation about an axis and including rotor surfaces thereon for engaging the second material and for accelerating the second material in a direction;

and a stator arrangement mounted at a location along the direction and including a plurality of stator surfaces for engaging the weed seeds to devitalize at least some of the weed seeds.

It is therefore an objective which may be satisfied by the arrangement described hereinafter to:

Provide farmers with the ability to harvest in very tough, green, and damp conditions while using the weed seed destructor.

Divide the straw and chaff/weed seed disposal systems right from the source without affecting the performance of the system.

Add a front portion to the existing chaff divider wall that will divide the straw from the chaff while providing air flow from the sieves through the wall to combine with the straw residue, providing a way for the straw, should it land on the divider, to slide off.

Provide a way to keep the guide wall system clean so farmers do not transport residue and weeds between fields.

Provide a way to allow cleaning airflow to combine with both the straw and chaff residue streams to exit the combine without restrictions.

Provide a way to protect the weed seed mill from plugging while maintaining the designed separation efficiency of the combine.

The term weed seed destruction used herein is used somewhat colloquially in that the seeds are not annihilated but are devitalized or rendered so that they cannot germinate. It will of course also be appreciated that not necessarily each and every seed is destroyed but that the intention is that a significant number will be incapable of germination so as to reduce the number of emerging seeds in the next growing season. Many different modalities for causing this devitalization are possible including grinding, impacts, radiation and chemical systems.

In one optional arrangement which can be used herein, one of primary and secondary destructors can use radiation applied to the seeds where the radiation comprises electromagnetic radiation which can include heat and/or light.

The combination of impact devitalization and radiation devitalization can thus be used in the present arrangement to obtain the best advantages of both systems. This can be used to devitalize the maximum number of seeds while each system works to its best effect to cause devitalization of different types of seed so as to reduce the power and complexity applied to both systems.

While in some embodiments described herein the fingers or elements extending rearwardly from the front section are mounted at a fixed location on the front section and remain fixed against movement, typically the fingers are sufficiently flexible that the rear tips of the fingers, which are unsupported, can move upwardly and downwardly and side to side in response to the vibration in the combine harvester and particularly in response to the passage of straw along the fingers. This vibration or flexing action can assist in carrying the straw to the rear edge and in release of the straw from the rear edge.

In some embodiments an additional vibration or reciprocating motion can be provided by components arranged to change the position or orientation of the mounting of the fingers or arranged to apply a force to the fingers without moving the mounting. Such vibrational force can be obtained with connection to other moving elements on the combine harvester.

Thus for example, the guide wall can be mounted for reciprocating movement of a rear end thereof. This can optionally be carried out by mounting the fingers of the guide wall at a front support which is pivotal about a transverse axis for upward and downward reciprocating movement of a rear end of the guide wall. This can be driven by a link from reciprocating movement of the sieve.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
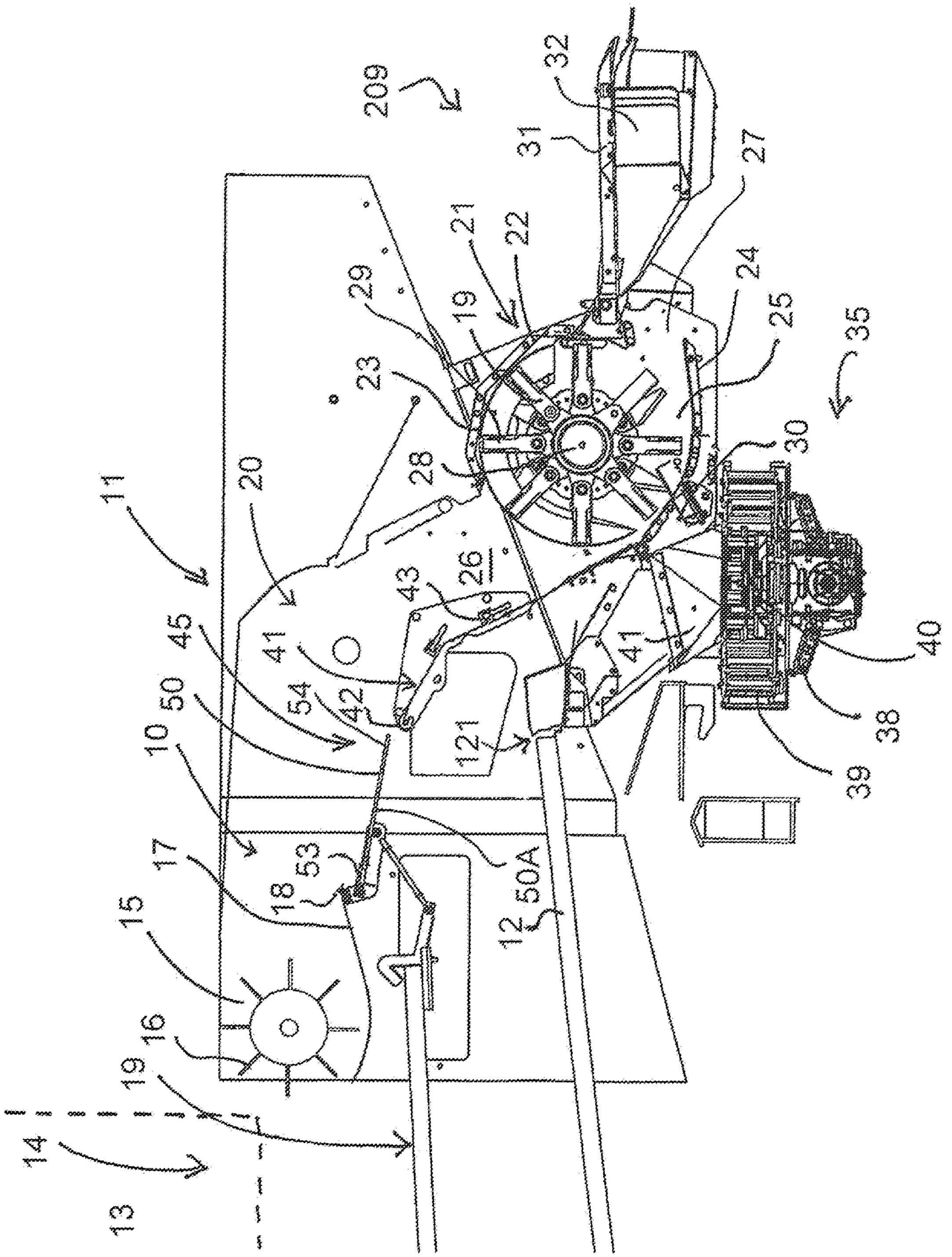
FIG. 1 is a side elevational view of an apparatus for destruction of weed seeds mounted in a combine harvest and including a guide wall separating the straw section from the chaff and weed seed section according to the present invention.
Figure 2:
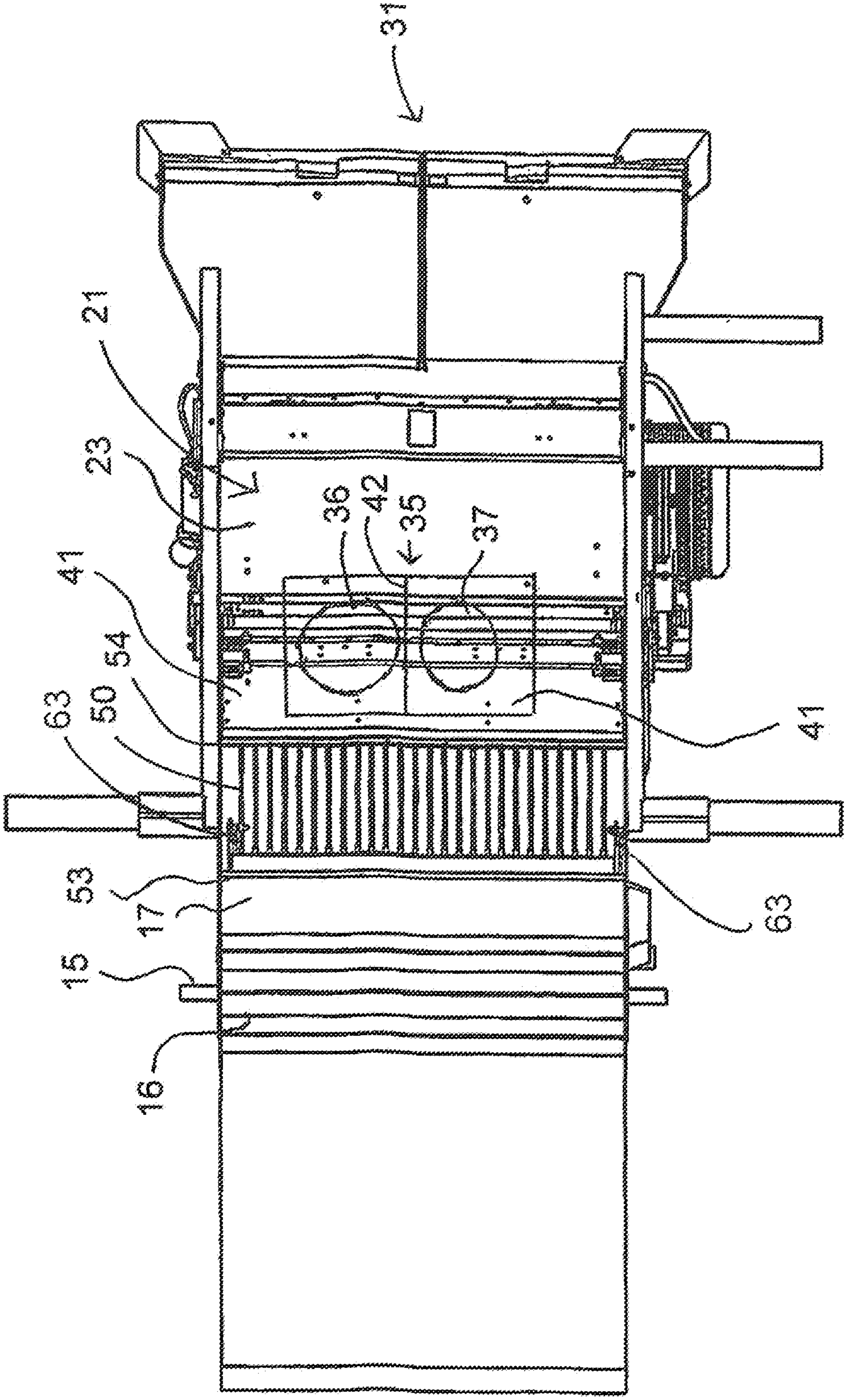
FIG. 2 is a top plan view of the apparatus of FIG. 1.

The apparatus 10 herein is shown in FIG. 1 mounted on a combine harvester 11 carried on ground wheels and including harvesting components of a conventional nature the rearmost one of which is the sieve 12 which discharges chaff and discarded seeds including weed seeds from the rear edge of the sieve.

A straw discharge arrangement 13 receives straw from a threshing rotor 14 and includes a discharge beater 15 in the form of a rotor with rotor paddles 16 passing over a bottom wall 17 to discharge separated straw over a rear edge 18 of the wall 17.

The wall 17 thus forms a concave surface which may or may not be perforated. An upper face of the concave surface cooperates with the beater in acting on the straw to provide a feeding action and in some cases a chopping action on the straw as it discharges from the threshing system. Such beaters are commonly used and the material acted upon by the rotor or beater is fed rearwardly with a momentum generated by the rotation of the paddle blades of the rotor. This rearward momentum is intended to carry the straw to in the straw path to the rear discharge components of the combine harvester. In some cases, an extension (not shown) of the wall can be added to carry the material further rearwardly. The wall and its extension is typically smooth and continuous to carry all of the straw rearwardly. A return grain pan of conventional construction is shown at 19 to carry grain dropping from the threshing rotor and beater forwardly from the beater for further processing.

At the rear of the straw discharge passage shown at 20 the combine harvester includes a straw spreading system 21 defined by a chopper and discharge arrangement shown in FIG. 1 which is basically as shown in the above cited US Patent 6840854. The chopper thus comprises a housing 22 defined by a top wall 23, a bottom wall 24 and two end walls 25. The end walls 25 include attachment means for attachment of the housing to the outlet of a combine harvester for discharge of straw from the combine harvester into an inlet opening 26 of the housing 22. The bottom wall 24 defines a semi-cylindrical portion extending from the inlet 26 to an outlet 27 through which chopped straw and air is discharged at relatively high velocity for spreading across the field in a wide spread pattern.

Within the housing is mounted a hub 28 which is carried on suitable bearings mounting a shaft for rotation about a hub axis at a center of the housing so that blade members 29 carried by the hub sweep around within the housing to entrap straw fed through the inlet 26 and to carry the straw and air past stationary blades 30 for chopping and for discharge through the outlet. The stationary blades are mounted on the housing at a position approximately midway between the inlet 26 and the outlet so that the blade members 29 sweep between the stationary blades 30 in a cutting action.

In this arrangement of the chopper, there can be provided three axially spaced sections of the chopper assembly including a first fan section at one end of the hub 17 and the second fan section at the other end of the hub 17. In-between the two narrow fan sections is defined a center section which provides the whole of the cutting action.

At the exit 27 is provided the material spreading assembly which can be the form of a tailboard 31 with guide fins 32 for receiving the chopped material and spreading the material to the rear and sides of the combine harvester. Alternately a spreader comprising a conventional arrangement using two rotating fan members side by side in a tailboard housing could be used to accelerate the straw into a spread pattern to the rear and the sides of the combine harvester.

In the Figures the seed destructor 35 includes two separate destructor elements 36, 37 side by side each including a housing 38 with a rotor 40 and a stator 39 formed by two or three stationary annular coaxial cylinders. The housing 25 causes the weed seeds to contact the stator 27 so that impacts between the stator and rotor thus devitalizing the seed. This arrangement is shown in detail in the above cited patents of the present applicant.

In operation, the flails of the rotor 40 acts to suck chaff and weed seed into each of the two side by side mills 36, 37 through a funnel 41 and accelerate and direct the material to impact and shear the material. The funnel has an open rectangular top mouth and converges downwardly and inwardly to a circular inlet above the rotor. The funnels meet at a center line or divider wall 42 so that the material including the chaff and weed seeds falls from the end 202 of the sieve 201 and divides at the center into one or other of the two destructor mills 23, 24 to be devitalized as described in the above cited prior patents.

The combine harvester thus comprises a separation system defined by the rotor or straw walkers (not shown) and the sieve 201 for separating from harvested crop a first material at a first discharge location 207 at the rear of the wall 206 comprising straw and a second material comprising chaff and weed seeds at a second discharge location 121 at the rear edge of the sieve 12.

The rotor or discharge beater 15 acts as a first material discharge section at a first discharge location 171 at the rear edge 18 of the bottom wall 17 and operates to throw the separated first material containing or consisting of the separated straw rearward toward the straw spreader or chopper 21.

The straw spreading section 21 operates to receive the straw from the rotor and acts to spread the straw onto the tailboard or spreader 31 so that it is discharged to the rear and to the sides of the combine harvester.

As is conventional and well known, the sieve 12 has openings allowing passage of separation air from below to separate chaff and weed seeds from grain so that the grain falls through to a collection system below while the chaff and weed seeds remain above the sieves and are discharged rearwardly over the rear edge 121 either in a curtain as the material drops off the rear edge or as a stream in the air flow which is discharged through the sieves and moves upwardly and rearwardly away from the sieves as a stream.

In order to maintain the separation of the streams of the straw from the edge 18 and the chaff from the edge 121, the combine conventionally comprises a rear guide wall portion 41 which extends across a full width of the combine between side edges of the combine. The portion 41 has a leading edge 42 spaced rearwardly from the discharge edge 18 thus leaving a space 45 between the beater or internal chopper discharge edge 18 and the leading edge 42. The wall portion 41 is inclined generally rearwardly and downwardly from the edge 42 to the rear edge 43 connected to the front edge 261 of the inlet 26 defined by the bottom wall 24 of the chopper. The wall portion 41 is attached to the side walls of the combine at the side edges by flanges at each side.

The apparatus, which is provided for attachment to the combine harvester either as a separate, independent components for sale as an after-market attachment product or as an integral component of the combine harvester as sold, includes the weed seed destructor section 35 and a guide wall arrangement 50 which is located in the space 45:

The destructor is of the general type shown and described in detail in the above patents. This includes the destructor rotor housing 38 arranged to be mounted behind the rear edge 121 of the sieve 12 to receive the chaff and weed seeds discharged from the rear edge, the destructor rotor arrangement 26 mounted in the destructor rotor housing for rotation about an axis and including rotor surfaces thereon for engaging the second material and for accelerating the second material in a direction and the stator arrangement 39 for engaging the weed seeds to devitalize at least some of the weed seeds;

The straw is thus guided in the straw path from the rotor 15 to the chopper 22 by a guide wall arrangement provided by the guide wall 17 under the rotor, by the rear portion 41 and by the guide construction 50 which extends between the rear edge 18 and the front edge 261 of the straw spreading section 21 so that the first material passes over the guide wall arrangement to the straw spreading section and the chaff and weed seeds pass underneath the guide wall arrangement to an inlet of the weed seed destructor section.

The guide wall 17 is conventional and conventionally provided in the combine harvester when supplied. The guide wall construction 50 is located adjacent the first material discharge section at the rear edge 18 and defines a dividing wall extending rearwardly from the rear edge 18 to support the straw as the straw moves rearwardly over the dividing wall.

Figure 3:
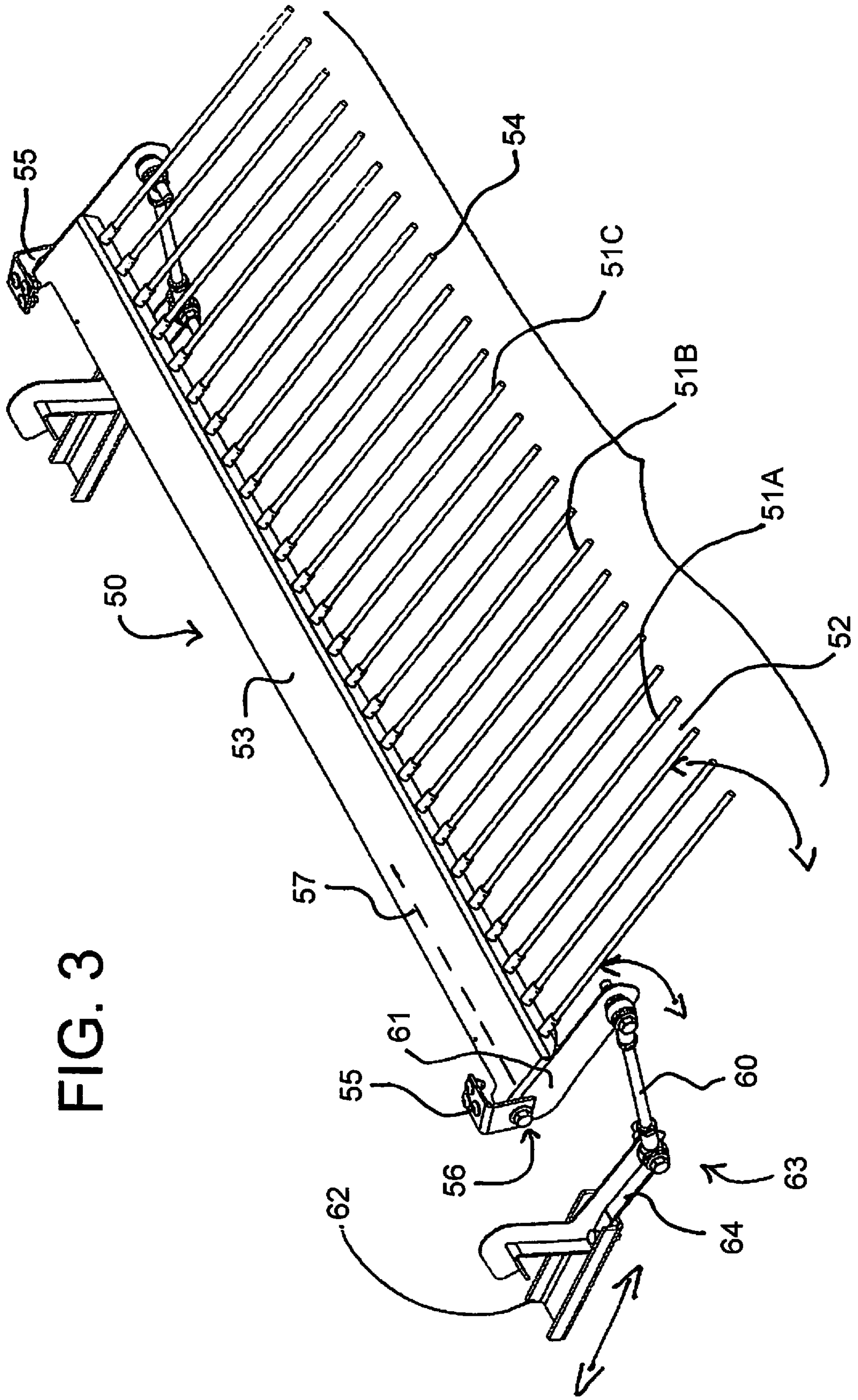
FIG. 3 is an isometric view on an enlarged scale of the guide wall of FIG. 1.

As best shown in FIG. 3, the guide construction 50 forms part of the guiding section for guiding the straw toward the straw discharge path defined by the chopper/spreader section while maintaining separation of the straw from the chaff and weed seeds and thus acts as set out above to reduce passage of the straw to the weed seed destructor section with consequent danger of blockages.

The guide construction 50 over which the first material passes contains at least one flexible element or finger 51A, 51B and 51C over which the straw passes. The fingers are relatively thin and formed of a material which flexes during operation to assist in flow of the first material thereover.

The guide construction 50 thus contains a plurality of the fingers 51A spaced apart by spaces 52 to allow airflow therebetween.

The guide construction 50 comprises a front solid bar section or support bar 53 with the fingers 51A cantilevered rearwardly from and supported by the front bar 53 without any interconnection between the fingers at the rear ends thereof such that the straw sheds rearwardly freely from the cantilevered fingers.

Thus the fingers are cantilevered from the front support bar 53 so that the fingers are spaced from each other to allow the air to pass between the fingers though the spaces 52 which are wider than the fingers to allow free air passage. The fingers are unsupported and unconnected at their rear end 54 thereof so as not to impede the free flow of the first material as it discharges from the rear end. This arrangement does not allow any hair-pinning of material as the rear end of the fingers are unobstructed to promote material to slide off without restriction. In this way, the guide construction 50 is wholly formed from an array of parallel rearwardly extending fingers lying in a common plane with the front support bar 53. The array of fingers thus forms a plane of support elements extending across a full width of the straw discharge passage.

The rear edge 54 of the guide wall extends to the adjacent divider panel 41 leading edge separating the straw discharge path from the weed seed destructor section and carrying the straw over the path containing the chaff to prevent or reduce the possibility of the straw entering the rotors of the WSD.

The support bar 53 can be attached to the rear edge 18 of the wall 17 by brackets 55. Alternatively, the two components can be manufactured as an integral item or can be attached to another part of the combine.

As shown in FIG. 1, the rear ends 54 of the fingers terminate at a position approximately aligned with the rear end 121 of the sieve so that air rising upwardly from the sieve can pass between the fingers. The wall portion 41 lies over the entrance to the destructor so that this provides an imperforate surface acting to separate the straw from the chaff and ensure that the chaff with weeds seeds enters the WSD. The chaff path thus enters the space between the underside of the fingers and the end of the sieve to allow that material to fall into the funnels of the destructor assisted by the intake air stream generated by the rotors. It has been proven that the majority of weeds seeds are within 100 mm of the top of the sieve even though some of the chaff may be elevated to a height 800 mm off of the sieves in some cases so that the chaff can blow between the fingers into the straw stream while the weed seeds remain below the fingers and thus are guided into the funnels of the destructors.

The guide wall and particularly the support bar 53 is mounted on pivot pins 56 defining a transverse pivot axis 57 for upward and downward reciprocating movement of the rear end 54 of the fingers. The upward and downward reciprocating movement of the rear end of the fingers is driven by a coupling linkage generally indicated at 63 including two links 60 and 61 and a drive coupling 64 from a drive portion 62 of the sieve 12 to use the forward and rearward reciprocating movement of the sieve. The drive coupling 64 can be attached to another reciprocating member of the combine.

The fingers are sufficiently flexible so that the upward and downward reciprocating movement causes upward and downward flexing or whipping or bending movements of the rear end 40D of the fingers of the guide wall to assist in release of the first material from the rear end thereof. The flexing allows a whipping action, up and down as well as side to side when actuated, to quickly move any lodged straw that could build up in wet conditions.

The guide construction 50 is inclined downwardly and rearwardly to allow flow of the first material rearwardly over the entrance funnels to the weed seed destructor section.

The guide construction 50 thus provides very low restriction to the sieve airflow from entering the stream of the first material to be discharged therefrom.

The fingers are spaced wider apart than the width of the fingers so as to create little restriction to air flow to avoid change in the sieve cleaning efficiency.

The guide construction 50 is thus active so that it shakes or vibrates to assist discharge of the material to the rear. The vibration may be provided by common movement with the combines sieves.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A combine harvester comprising:

a separation system for separating from harvested crop a first material at a first discharge location comprising straw and a second material comprising chaff and weed seeds at a second discharge location;

a first material discharge section at the first discharge location arranged to move the separated first material rearward for discharge in a discharge direction along a straw discharge path, the first material discharge section including a rotary body;

the separation system including at least one sieve arranged at a height below the first material discharge section, the sieve having openings thereon allowing passage of separation air to separate chaff and weed seeds from grain and the sieve having a rear edge over which the chaff and weed seeds are discharged;

a weed seed destructor section for receiving the second material comprising chaff and weed seeds, the weed seed destructor section including components therein for devitalizing at least some weed seeds in the second material;

and a guide construction for guiding the first material comprising straw from the discharge section in the straw discharge path along the discharge direction while maintaining separation of the first material from the second material and thus acting to reduce passage of the first material to the weed seed destructor section;

wherein the guide construction comprises a front section extending transversely to the discharge direction and a plurality of fingers extending rearwardly from the front section along the discharge direction, the plurality of fingers being parallel and transversely spaced apart;

the plurality of fingers of the guide construction defining a surface over which the first material passes;

the plurality of fingers of the guide construction defining openings therebetween for passage of the separation air from the sieve into the straw discharge path;

the plurality of fingers of the guide construction being cantilevered from the front section so that rear ends of the fingers are separate from adjacent fingers and unsupported so as to allow the first material to be released from the rear ends thereof to continue along the straw discharge path;

wherein each of the fingers of the guide construction is flexible to provide flexing, whipping and bending movements of the separate unsupported rear end of the fingers of the guide construction up and down as well as side to side to assist in release of the first material from the rear end thereof.

2. The combine harvester according to claim 1 wherein the fingers are round in cross section.

3. The combine harvester according to claim 1 wherein the fingers are spaced wider apart than a width of the fingers so as to create little restriction to air flow to avoid change in a cleaning efficiency of the sieve.

4. The combine harvester according to claim 1 wherein the fingers are shaped so as to prevent hair-pinning of the first material as the rear end of the fingers and are unobstructed to allow the first material to slide off without restriction.

5. The combine harvester according to claim 1 wherein there is provided an impervious divider panel separating the straw discharge path from the weed seed destructor section which is located at the rear edge of the guide construction.

6. The combine harvester according to claim 1 wherein the rotary body comprises a beater or internal chopper and includes a guide surface which is curved to as to partly wrap around the beater or internal chopper.

7. The combine harvester according to claim 6 wherein the rotary body is arranged to form the first material into a stream and the guide surface extends to a rear edge from which the stream is released.

8. The combine harvester according to claim 7 wherein the guide construction is inclined downwardly and rearwardly from the rear edge of the guide surface to allow flow of the first material rearwardly from the rear edge of the guide surface over an entrance of the weed seed destructor section.

9. The combine harvester according to claim 1 wherein there is provided a straw spreading section arranged to receive the first material from the first material discharge section and to spread the first material at least to the sides of the combine harvester.

10. The combine harvester according to claim 9 wherein the straw spreading section includes a rotating straw chopper cooperating with stationary cutting blades.

11. The combine harvester according to claim 1 wherein the front section of the guide construction is pivotal about a transverse axis for upward and downward reciprocating movement of the rear end of the fingers.

12. The combine harvester according to claim 11 wherein the upward and downward reciprocating movement of the rear end of the fingers is driven by a link from a reciprocating movement of a component of the combine harvester.

* * * * *